United States Patent [19]

Yasuda

[11] Patent Number: 5,349,673
[45] Date of Patent: Sep. 20, 1994

[54] MASTER/SLAVE SYSTEM AND ITS CONTROL PROGRAM EXECUTING METHOD

[75] Inventor: Susumu Yasuda, Hino, Japan

[73] Assignee: Kabushiki Kaisha Toshiba, Kawasaki, Japan

[21] Appl. No.: 557,458

[22] Filed: Jul. 25, 1990

[30] Foreign Application Priority Data

Jul. 28, 1989 [JP] Japan .................. 1-193857

[51] Int. Cl.$^5$ .............................. G06F 13/00
[52] U.S. Cl. .................................. 395/800; 395/700; 364/DIG. 2; 364/931.44; 364/942.4; 364/946.6; 364/975.1; 364/975.2
[58] Field of Search .................. 395/800, 700

[56] References Cited

U.S. PATENT DOCUMENTS

| | | | |
|---|---|---|---|
| 4,639,852 | 1/1987 | Motomiya | 364/138 |
| 5,187,794 | 2/1993 | Hall | 395/800 |
| 5,191,648 | 3/1993 | Ikenoue et al. | 395/200 |
| 5,210,834 | 5/1993 | Zurawski et al. | 395/375 |

Primary Examiner—Gareth D. Shaw
Assistant Examiner—Kakali Chaki
Attorney, Agent, or Firm—Finnegan, Henderson, Farabow, Garrett & Dunner

[57] ABSTRACT

A master/slave system which includes an electronic exchange as a master device and various types of terminal units as slave devices connected to the electronic exchange. The electronic exchange is arranged to supply, at the time of a slave device is started, a program for managing and controlling the slave devices to the started slave device. In the system, for example, a control program describing only a control procedure common to the slave devices is stored in the master device and other control programs each uniquely corresponding to each of different specifications of the respective slave devices are stored in the respective slave devices, whereby the size of the control program stored in the master device can be minimized.

8 Claims, 6 Drawing Sheets

FIG. 2 *Prior Art*

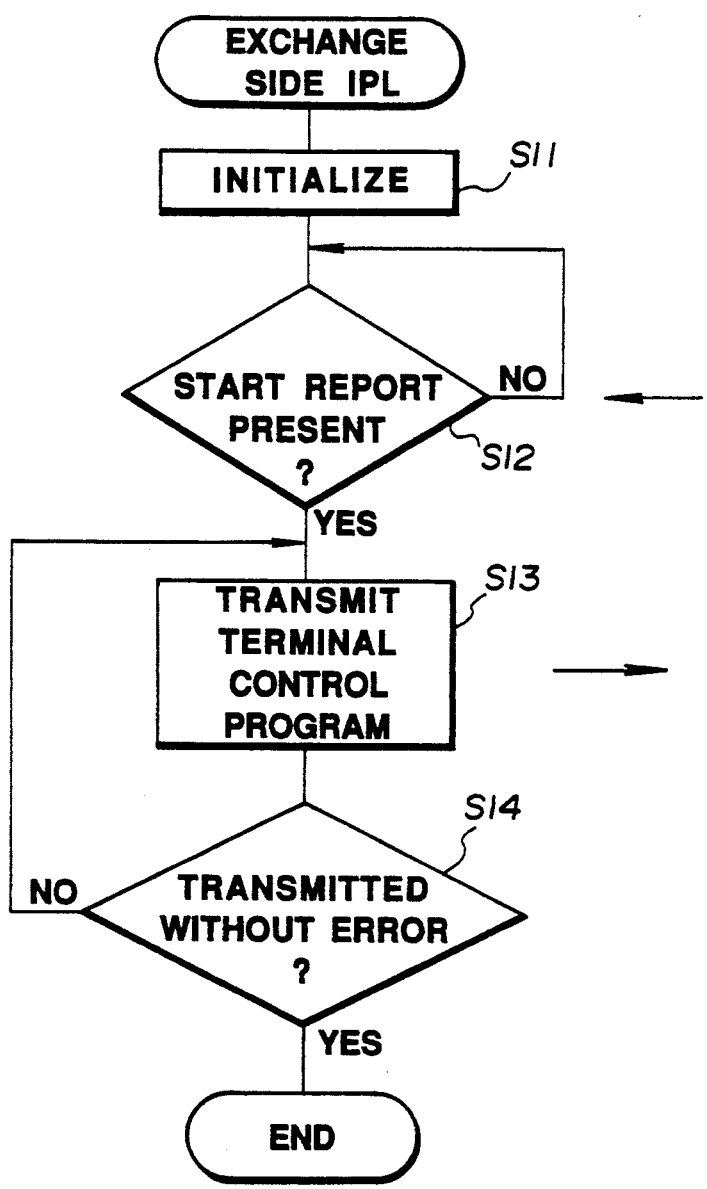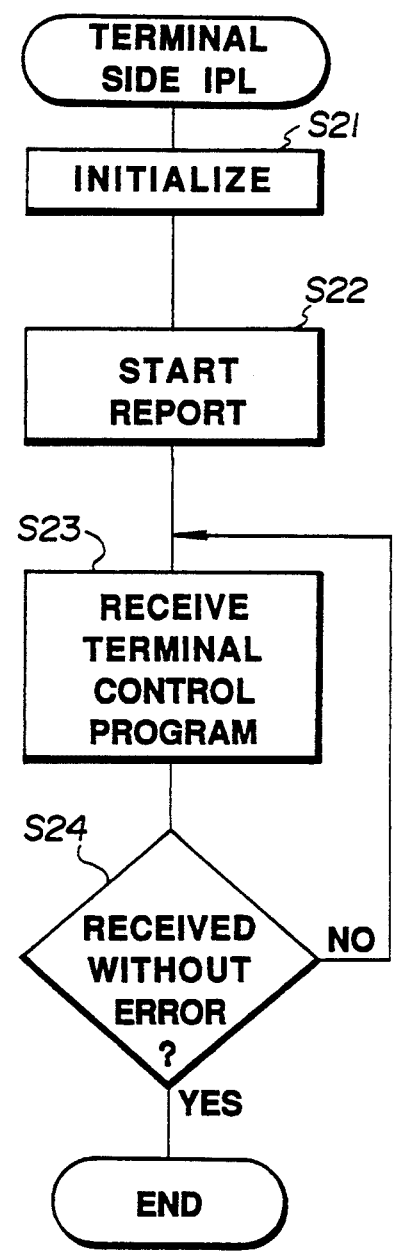
FIG. 4A
FIG. 4B

MASTER/SLAVE SYSTEM AND ITS CONTROL PROGRAM EXECUTING METHOD

BACKGROUND OF THE INVENTION

1. Field of the Invention

The present invention relates to master/slave systems and methods of executing control programs for the systems and more particularly, to a master/slave system which comprises an electronic exchange and a plurality of slave devices such as various sorts of terminal units connected to the electronic exchange to generally manage and control the slave devices and which can efficiently store programs necessary for the management and control of the slave device and also to a control program executing method.

2. Description of the Related Art

FIG. 1 schematically shows an example of such master/slave systems wherein an electronic exchange is connected with various sorts of terminal units.

In FIG. 1, more in detail, an electronic exchange 10 is connected with terminal units 21, 22 . . . , and 2n including such a voice communication terminal as an electronic key telephone set, facsimile equipment and other data communication terminals. As illustrated, the electronic exchange 10 is connected to central office lines 30 (31 to 3m) as data exchange media with external apparatuses, and the electronic exchange 10 and the respective terminal units 21 to 2n are interconnected by means of internal communication lines 40 (41 to 4n) which are provided therebetween and are used also as power supply lines.

Explanation will be made as to the functions of respective components of the electronic exchange system by referring to FIG. 1.

The electronic exchange 10 as a master device includes trunk circuits 11 (111 to 11m) for performing data exchanging operation with the external apparatuses through the central office lines 30, line circuits 12 (121 to 12n) connected with the respective terminal units 21 to 2n through the internal communication lines 40 to perform transfer of various data between the line circuits and terminal units, and a switch network 13 provided between the trunk circuits 11 and line circuits 12 to perform logical connection/disconnection between these circuits (between the trunk circuits 11 and line circuits 12 or between the line circuits 12) as necessary. That is, the substantial data exchanging operation of the electronic exchange is carried out through the respective circuits.

The electronic exchange 10 also includes a CPU 14 for generally performing various sorts of management and control required for the electronic exchange 10 including the connection/disconnection control between the switch network 13 and CPU 14, the management of status of the respective terminal units, and the transmission/reception control of data in the data exchanging operation. The electronic exchange 10 further includes a ROM (read-only memory) 15, a RAM (random access memory) 16 and a magnetic disk (such as a hard disk, a floppy-disk unit, an opto-magnetic disk unit or the like) 17, in which such various sorts of programs and data necessary for the management and control of the CPU 14 are stored fixedly or on a random access basis.

Explanation will be directed to the respective terminal units as slave devices, in particular, to the first terminal unit 21. More specifically, the first terminal unit 21 includes a line circuit 211 which is connected to associated one 121 of the line circuits 12 of the electronic exchange 10 through associated one 41 of the internal communication lines 40 to perform transfer of various sorts of data between the first terminal unit 21 and electronic exchange 10, a CPU 212 which is connected to the line circuit 211 to perform various sorts of control over the respective constituent parts of the first terminal unit 21 including the control of data transmission and reception in the data transfer and the necessary status management of the respective constituent parts, and a ROM 213 and a RAM 214 in which various sorts of programs and data necessary for the management and control of the CPU 212 are stored fixedly or on a random access basis.

The first terminal unit 21 also includes a keyboard 215 to be directly operated by a user, a keyboard controller 216 for informing the CPU 212 of an operation data of the keyboard 215, a display 217 for visually indicating thereon such data as an operational guide, operational contents and so on of the terminal unit 21, and a display controller 218 for executing, in response to a command received from the CPU 212, the display control over the display 217.

Each of the other terminal units 22 to 2n has substantially the same basic arrangement as the first terminal unit 21 and the same parts as those in the first terminal unit 21 or parts having substantially equivalent functions in the first terminal unit 21 are denoted by the corresponding reference numerals. In practical applications, however, these terminal units 21 to 2n usually include dominantly different kinds of mixed terminal units which are different in hardware or software configuration or in operational specification, though they partly include identical kinds of terminal units which have the same configuration and function.

Such an electronic exchange system is based on the idea that the electronic exchange 10 as the master device generally controls all the terminal units as its slave devices and more specifically on the idea that the master device side controls all the control programs on the operation of the system to collectively perform updating of program versions, bug correction and so on. Thus, it is common practice that the electronic exchange system is arranged so that the electronic exchange 10 holds all the control programs including the control program of the electronic exchange 10 itself and the control programs of the respective terminal units and when each terminal unit requires its control program to start (become active), the electronic exchange 10 loads the control program into the associated terminal unit.

FIG. 2 shows such a conventional control program control technique as based on the above idea. In the drawing, the same or equivalent elements as or to those in FIG. 1 are denoted by the same or corresponding reference numerals and explanation thereof is omitted.

In FIG. 2, the electronic exchange 10 has a memory area 50 which corresponds to the virtual collection of respective memory areas of the ROM 15, RAM 16 and magnetic disk 17. The memory area 50 has such memory divisions (a) to (f) as shown in FIG. 2, as follows.

(a) IPL Area 50a:

Stores therein an IPL (initial program loader) as an initial start program of the electronic exchange 10 itself. This area is usually provided in the ROM 15.

(b) Exchanging Program Area 50b:

Stores therein programs necessary in the data exchanging operation of the electronic exchange 10. This area is usually provided in the RAM 16 or in the magnetic disk 17.

(c) First Terminal Control Program Area 50c1:

Stores there in all the control programs on the first terminal unit 21. This area is usually provided in the magnetic disk 17.

(d) Second Terminal Control Program Area 50c2:

Stores therein all the control programs on the second terminal unit 22. This area is usually provided in the magnetic disk 17.

(e) N-th Terminal Control Program Area 50cn:

Stores therein all the control programs on the n-th terminal unit 2n. This area is usually provided in the magnetic disk 17.

(f) Working Area 50d:

Preserved as the working area in executing various sorts of control and processing to temporarily store therein data and programs required every time. This area is usually provided in the RAM 16 or in the magnetic disk 17.

Another terminal unit, for example, the first terminal unit 21, as shown in FIG. 2, includes a ROM 213 having an IPL area 213a for storing therein an IPL of the terminal unit 21 itself, and a RAM 214 having a control program loading area 214a into which the control program stored in the first terminal control program area 50c1 is loaded from the electronic exchange 10. The RAM 214 also has a working area 214b for the terminal unit 21 itself.

Such a memory structure of the first terminal unit 21 is substantially the same as that of the second terminal unit 22 that is different in type from the first terminal unit. In particular, when it is desired to start the second terminal unit 22, the control program of the second terminal unit 22 stored in the second terminal control program area 50c2 is loaded from the electronic exchange 10 into the control program loading area 224a.

These first and second terminal units 21 and 22, after the corresponding control programs are loaded into the respective control program loading areas of the units, receive exchange services corresponding to the respective specifications of the terminal units in accordance with their own loaded control programs.

In this way, in the prior art system, all the control programs corresponding to the respective specifications of the terminal units are previously prepared on the side of the electronic exchange 10 as the master device so that, when each terminal unit as the slave device is started, the corresponding control program is separately supplied to the corresponding terminal unit. For this reason, even when different sorts of a plurality of slave devices are collectively connected to the single master device, the master device can provide reasonable, fine and delicate services to these slave devices.

Such a prior art system, however, which requires the master device to always secure a large memory area for the purpose of storing therein all the control programs of the respective slave devices, must enlarge, as a matter of course, the scale of memory unit configuration of the master device. Such a problem becomes more severe as the scale of the system is enlarged, i.e., as the number of slave devices to be connected to the master device is increased, and in an extreme case, the number of slave devices connectable in the system may be restricted merely by the capacity of the memory of the master device.

In addition, the prior art system has such a problem that, when it is required to rewrite the control programs for some reasons such as updating of program versions, bug correction and so on, all the control programs stored in the respective slave device control program areas of the master device (the first terminal control program area 50c1 to the n-th terminal control program area 50cn) must be correspondingly rewritten, thereby involving the troublesome program maintenance problem.

SUMMARY OF THE INVENTION

In view of the above circumstances, it is an object of the present invention to provide a master/slave system which is intended to control all slave devices on the side of a master device, i.e., to control all the control programs necessary to operate the system on the side of the master device and which can realize efficient execution of the control programs to thereby reduce the necessary memory capacity burden of the master device itself to a large extent and correspondingly to highly facilitate the management and maintenance of the programs through the master device, and also to provide a method for executing the control programs.

More specifically, in accordance with the present invention, from a point of view that, in such a master/slave system as the aforementioned electronic exchange system, though a plurality of types of slave devices are connected to the single master device, the control contents of the respective slave devices contain a major common part except for parts for absorption of differences between the slave devices in hardware specification; the control program for each slave device is roughly divided into first and second control programs (A) and (B) which follow. That is, (A) First Control Program Corresponds to that content part of the slave device control program which is common to the respective slave devices and which describes its control procedure. It is this part of the slave device control program that is rewritten for such reasons as the updating of program version or bug correction as mentioned earlier.

(B) Second Control Program

Corresponds to that content part of the slave device control program which is unique to the slave device itself and which describes its own control procedure corresponding to the specification of the slave device different from those of the other slave devices. This program part is not usually rewritten. And previously stored in the slave unit control program area of the master device is at least the first control program (A) which is commonly supplied (loaded) into the slave devices as a common control program when it is desired to start the slave devices.

With such an arrangement, the amount of program which the master device itself must hold as the control programs of the respective slave devices can be remarkably reduced. So long as the master device holds at least the first control program (A), the common supply of the first control program to the slave devices enables the basic control of the master/slave system. Further, the program updating and maintenance through the master device are required only with respect to the first control program held in the master device, the program management itself can be highly facilitated.

Meanwhile, since the second control program (B) is very rarely rewritten, the program storage place and method can be selected with an increased degree of freedom. The second control program may be stored basically in the two manners which follow.

(1) The second control programs corresponding to different specifications of the respective slave devices are separately stored into the respective slave devices, for example, respectively in the form of a ROM. In this case, all the master device itself must hold as the control program for the respective slave devices is only the first control program, which results in that the storage area of the master device can be further increased in its usage efficiency.

(2) The second control programs, in addition to the first control program, are also held in the master device. In this case, the second control program is stored in a storage area different from that of the first control program, as a matter of course. As in the case of the first control program, the second control programs may be stored in the form of a ROM. This method (2) achieve the high usage efficiency of the storage area of the master device as the method (1), but can be more effective in the area usage efficiency than the aforementioned prior art system by an amount corresponding to the non-overlapped first control programs in the aforementioned prior art system.

In the case where the method (1) is employed, when one of the slave devices is started, the first control program is loaded from the master device into the started slave device and stored therein and thereafter the corresponding slave device is controllably operated through the cooperative execution of the stored first control program and the second control program previously stored in the slave device. In the case where the method (2) is employed, on the other hand, when one of the slave devices is started, the the first control program as well as associated one of the second programs allocated to the started slave device are loaded from the master device into the corresponding slave device and stored therein and thereafter the corresponding slave device is controllably operated through the cooperative execution of the loaded first and second control programs.

BRIEF DESCRIPTION OF THE DRAWINGS

FIGS. 4A and 4B show flowcharts for explaining the exemplary IPL operations of master and slave devices in the embodiment system;

DESCRIPTION OF THE PREFERRED EMBODIMENTS

Figure 3:
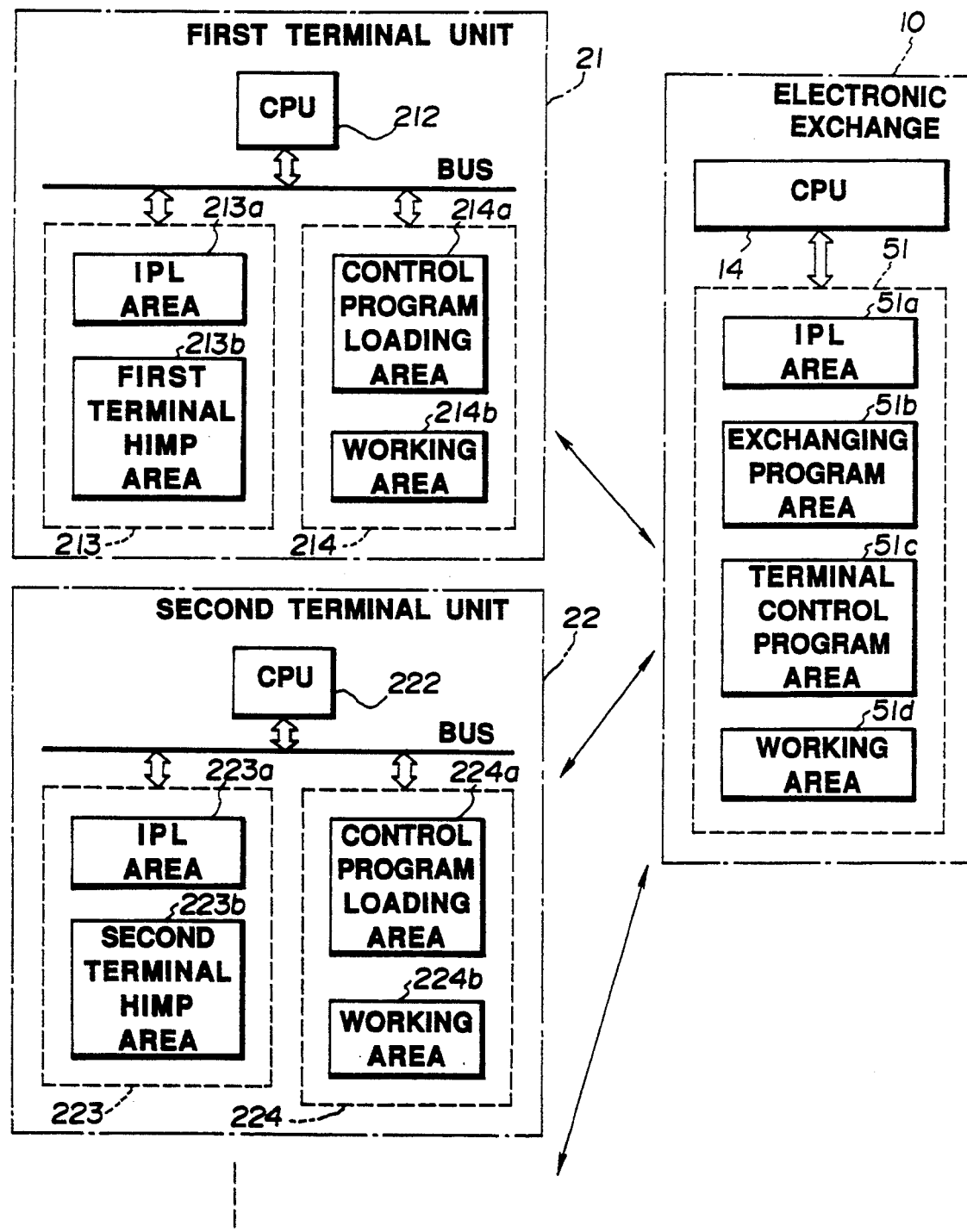
FIG. 3 is a block diagram for explaining a control program executing technique used in a master/slave system in accordance with an embodiment of the present invention.

Referring first to FIG. 3, there is schematically shown a control program executing method which is employed in a master/slave system in accordance with an embodiment of the present invention.

Figure 1:
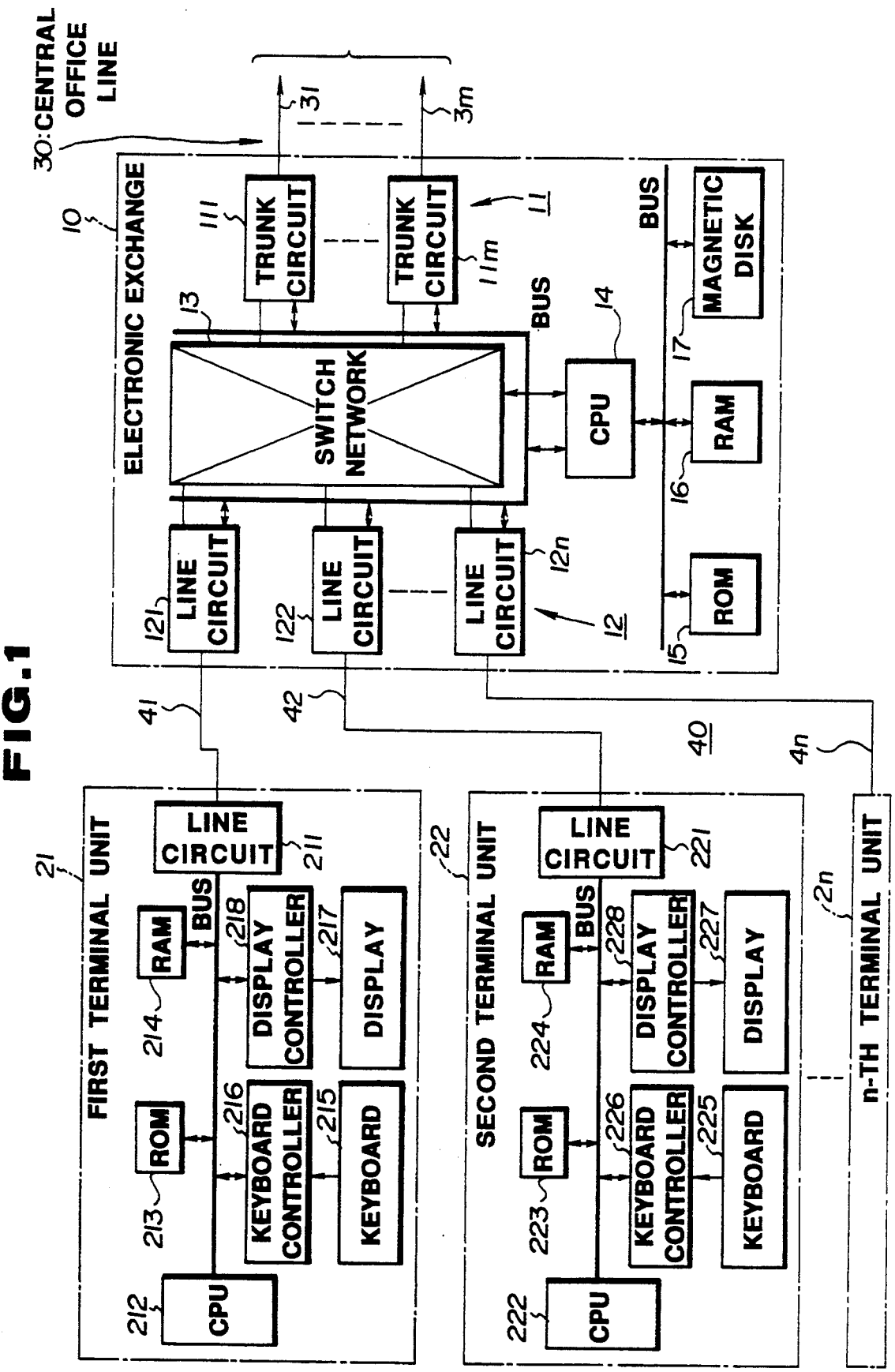
FIG. 1 is a block diagram showing a schematic arrangement of an electronic exchange system as an example of master/slave system to which the present invention is applied.
Figure 2:
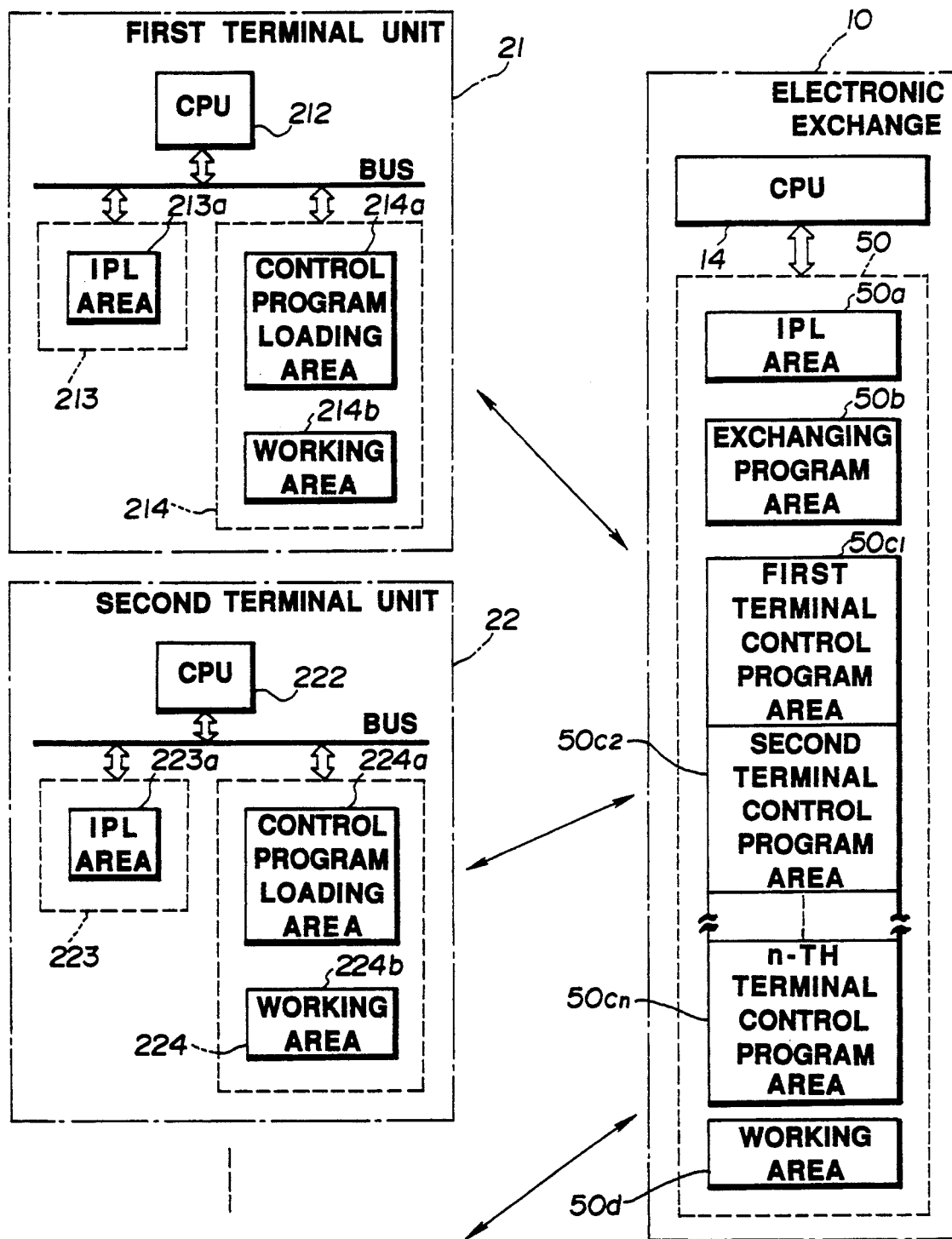
FIG. 2 is a block diagram for explaining a prior art control program executing technique used in the electronic exchange system.

The system of the present embodiment is also supposed to be such an electronic exchange system as exemplified in FIG. 1. FIG. 3 shows the memory structures of the electronic exchange 10 and terminal units 21, 22 . . . and 2n in the electronic exchange system, corresponding to FIG. 2.

More specifically, in FIG. 3, the electronic exchange 10 has a memory area 51 which corresponds to the virtual collection of respective memory areas of the ROM 15, RAM 16 and magnetic disk 17. The memory area 51 has such memory divisions (a) to (f) as shown in FIG. 3, as follows.

(a) IPL Area 51a:

Stores therein an IPL (initial program loader) as an initial start program of the electronic exchange 10 itself. This area is usually provided in the ROM 15.

(b) Exchanging Program Area 51b:

Stores therein programs necessary in the data exchanging operation of the electronic exchange 10. This area is usually provided in the RAM 16 or in the magnetic disk 17.

(c) Terminal Control Program Area 51c:

Stores therein the control program which is common to the terminal units connected to the electronic exchange 10 and which describes the contents of common control procedure. Though the terminal units connected to the electronic exchange 10 are different from each other in the specification and type, the terminal units usually have a major common control program part except for parts for absorption of differences between the terminal units in hardware specification. In the system of the present embodiment, the common part of the control programs is previously stored in this area 51c as a main routine program. In the illustrated electronic exchange system, the common main routine program includes a program for inputting key data through the terminal units and transferring the key data to the electronic exchange 10 and a program for monitoring the on-hook/off-hook state of the respective terminal units. It is mainly this common program that is to be rewritten for such reasons as the updating of program version and bug correction. This area is usually provided in the magnetic disk 17.

(d) Working Area 51d:

Preserved as the working area in executing various sorts of control and processing to temporarily store therein data and programs required every time. This area is usually provided in the RAM 16 or in the magnetic disk 17.

On the other hand, each of the terminal units, e.g., the first terminal unit 21 has area divisions (e), (f), (g) and (h) which follow, as shown in FIG. 3.

That is, (e) IPL Area 213a:

Stores therein an IPL as the initial start program of the first terminal unit 21. This area is provided in a ROM 213.

(f) First Terminal HIMP Area 213b:

Stores therein a HIMP (hardware interface module program) which corresponds uniquely to the hardware specification of the first terminal unit 21 itself and which describes its unique control procedure. The HIMP corresponds to the program part for absorbing differences between the terminal units in the hardware specification. In the system of the present embodiment, the HIMP is previously stored in this area 213b of the ROM 213 as a so-called subroutine program. In the exemplified electronic exchange system, the HIMP includes a program for absorbing keyboard differences in hardware specification (such as difference between non-lock type and lock type or difference in the number of keys), differences in display type (display difference between LED-alone type and LED-LCD-mixed type), and so on. Since this program part is not usually rewritten, it may be stored in the form of a ROM as in the illustrated example.

(g) Control Program Loading Area 214a:

Loads thereinto from the electronic exchange 10 the control program which is stored in the terminal control program area 51c of the electronic exchange 10 when the first terminal unit 21 is started. As mentioned above, the loaded control program is commonly used by the terminal units and usually provided in RAM 214.

(h) Working Area 214b:

Used for working of the first terminal unit 21. This area is reservedly provided within the RAM 214 as a working area for the first terminal unit 21 to use in carrying out various sorts of control and processing. Temporarily stores therein data and programs as necessary.

The second terminal unit 22, which is supposed be different in specification from the first terminal unit 21, has substantially the same memory structures (e) to (h) as those of the first terminal unit 21. In the case of the second terminal unit 22, in particular, a HIMP unique to the second terminal unit 22 and describing the unique control procedure corresponding to the hardware specification of the second terminal 22 is previously stored in a second terminal HIMP area 223b. When the second terminal unit 22 is started, the program loaded into a control program loading area 224a is the same as the control program loaded into the control program loading area 214a of the first terminal unit 21.

FIGS. 4A and 4B show exemplary flowcharts for explaining how the IPL is operated in the electronic exchange 10 and the respective terminal units. Explanation will be made by referring to FIG. 4 as to how the control program is loaded when each terminal unit is started.

In the event where the electronic exchange 10 is already started so that the electronic exchange 10 completes its initialization including the internal check and the reservation of the working area 51d (step S11 in FIG. 4A) and gets ready for waiting for a report indicative of the start of the terminal unit (step S12 in FIG. 4A), if the terminal unit is started then the terminal unit performs its IPL processing for its own initialization (step S21 in FIG. 4B) and transmits to the electronic exchange 10 a signal indicative of the start of the terminal unit (which is referred to as start report) (step S22 in FIG. 4B). The electronic exchange 10, when receiving such a start report from the terminal unit, recognizes the report (step S12 in FIG. 4A) and starts transmitting to the terminal unit the control program stored in the terminal control program area 51c (step S13 in FIG. 4A).

In response to the transmission of the control program from the electronic exchange 10, the terminal unit intended to receive the control program starts receiving the control program (step S23 in FIG. 4B) and stores the received control program in its control program loading area (214a, 224a . . . ).

When the transmission and reception of the terminal control program from the electronic exchange 10 and at the terminal unit are normally completed in this way, the electronic exchange 10 and terminal unit finish their IPL processing. If an error takes place during the transmission or reception of the control program and the control program is not transmitted nor received normally, then the re-transmission and re-reception of the control program are carried out between the electronic exchange 10 and associated terminal unit (step S14 in FIG. 4A and step S24 in FIG. 4B).

After the loading (supply) of the control program into the control program loading area of the terminal unit is completed through the above IPL processing, the terminal unit can receive the exchange services corresponding to the specification of the terminal unit in accordance with the cooperative operation of the terminal control program loaded in the loading area and the HIMP previously stored in the HIMP area (213b, 223b . . . ).

Explanation will next be made by referring to FIG. 5 in connection with the case where, when the keyboard 215 (refer to FIG. 1) of the first terminal unit 21 is of a non-lock type and the keyboard 225 (refer to FIG. 1) of the second terminal unit 22 is of a lock type as an example of the exchange services of the system, how the electronic exchange 10 recognizes the key operation data (key data) of the first and second terminal units 21 and 22.

Figure 5A:
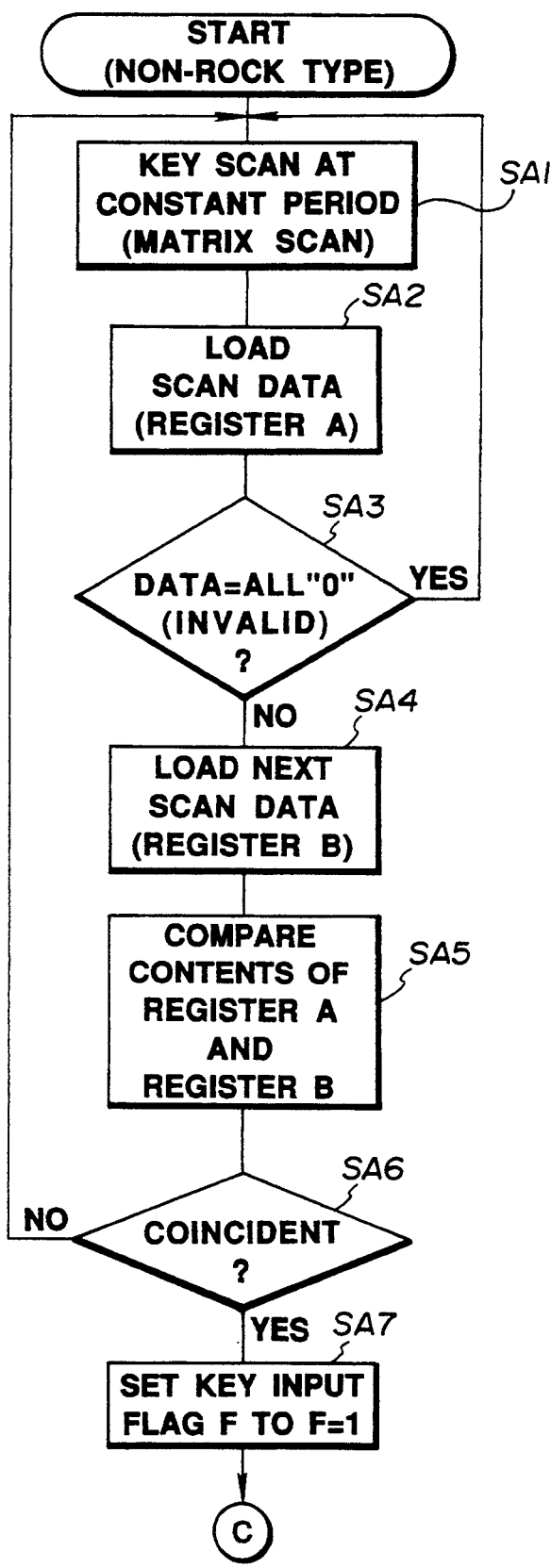
FIGS. 5A–5C show flowcharts for explaining an exemplary execution of a control program in the embodiment system.
Figure 5B:
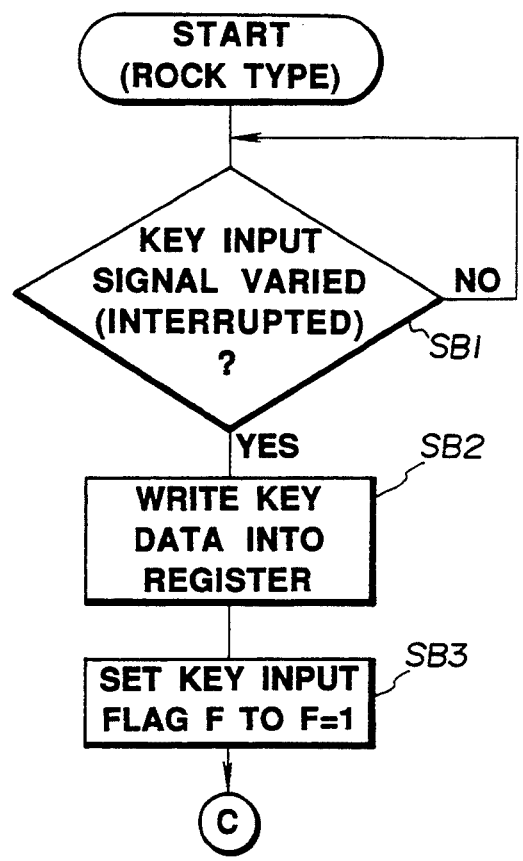
Figure 5C:
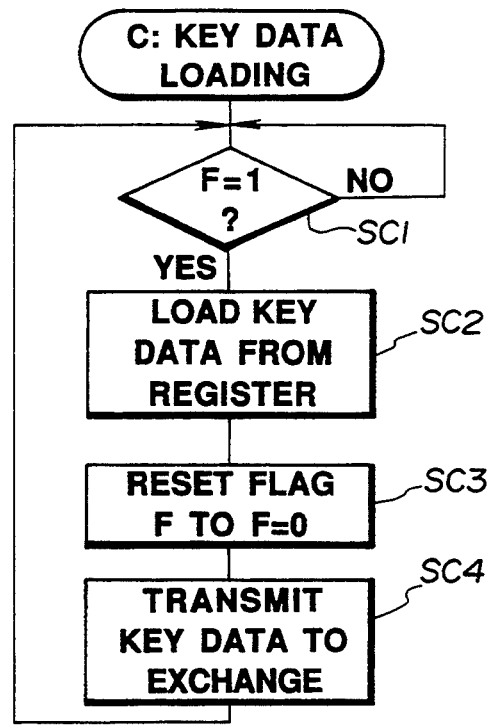

In this case, the first terminal HIMP stored in the HIMP area 213b of the first terminal unit 21 contains a program for transferring a report indicative of the key input and its key data to the common terminal control program in accordance with its own non-lock type keyboard specification as shown in FIG. 5A: the second terminal HIMP stored in the HIMP area 223b of the second terminal unit 22 contains a program for transferring a report indicative of the key input and its key data to the common terminal control program in accordance with its own lock type keyboard specification as shown in FIG. 5B; and the common terminal control program commonly transferred and stored in the control program loading areas of these terminal units contains a program for monitoring the reception of the key input reports of the respective terminal units through the HIMPs and in the presence or any of the key input reports, for transferring the reported key data to the electronic exchange 10 as shown in FIG. 5C.

These programs will be detailed in connection with the operation of each of these terminal units.

First, the first terminal unit 21 executes the input and transmission of the key data in accordance with the first terminal HIMP and common terminal control program in the following manner. That is, more in detail:

(1) The first terminal unit 21 performs its key scanning operation (matrix scanning operation) at a constant period base on its own clock signal (step SA1 in FIG. 5A) and loads all the scanned data into a register A (not shown)(for example, register incorporated in the CPU 212) (step SA2 in FIG. 5A).

(2) The first terminal unit monitors the loaded scanned data (step SA3 in FIG. 5A) and if the scanned data comprises all "0s", i.e., if the keyboard is not operated, invalidates the data and repeats the above scanning operation (1) . When the scanned data comprises data other than all "0s", the terminal unit loads the scanned data in the next scanning period into a register B (not shown)(for example, register incorporated also in the CPU 212) (step SA4 in FIG. 5A).

(3) After loading the scanned data into the register B, the terminal unit compares the scanned data of the register A and that of the register B (step SA5 in FIG. 5A). When a coincidence is found between these scanned data (step SA6 in FIG. 5A), the terminal unit judges that the data has been rightly entered through user's key input operation, sets a key input flag F (sets F=1) in a flag register (not shown)(for example, flag register incorporated in the CPU 212), and transfers the subsequent control to the above common terminal control program (step SA6 in FIG. 5A). When a non-coincidence is found between the scanned data of the registers A and B, the terminal unit judges the data as based on an erroneous key input, invalidates the data, and repeats the scanning operation (1).

(4) The first terminal unit 21, when setting the key input flag F, further confirms the flag F=1 through the common terminal control program (SC1 in FIG. 5C), loads the scanned data stored in the register B, for example, into its working area 214b as a key data (step SC2 in FIG. 5C), resets the key input flag F of the flag register (step SC3 in FIG. 5C), and transmits the loaded key data to the electronic exchange 10 (SC4 in FIG. 5C).

Through such a series of processing of the first terminal unit 21, the electronic exchange 10 can recognize the key operation data. In this connection, these key data processing speeds including the key scanning speed (period) are usually set to be much faster than operator's manual key operating speed, so that the key-in data can be smoothly moved without being accumulated in the register or working area of the first terminal unit 21.

The second terminal unit 22, on the other hand, executes the input and transmission of the key data in accordance with the second terminal HIMP and common terminal control program in the following manner. That is, more in detail:

(1) The second terminal unit 22 monitors a variation in the key input signal (the presence or absence of an interrupt based on a key input) (step SB1 in FIG. 5B). When detecting the variation, the terminal unit writes the then key data (corresponding to the locked key) into a register (not shown)(for example, register incorporated in the CPU 222) (step SB2 in FIG. 5B).

(2) Thereafter, the terminal unit sets a key input flag F (sets F=1) in a not shown flag register (for example, flag register incorporated in the CPU 222) and transfers the subsequent control to the common terminal control program (step SB3 in FIG. 5B).

(3) The second terminal unit 22, when setting the key input flag F, further confirms the flag F=1 through the common terminal control program (SC1 in FIG. 5C), loads the scanned data stored in the register B, for example, into its working area 214b as a key data (step SC2 in FIG. 5C), resets the key input flag F of the flag register (step SC3 in FIG. 5C), and transmits the loaded key data to the electronic exchange 10 (SC4 in FIG. 5C).

Through such a series of processing of the second terminal unit 22, the electronic exchange 10 can recognize the key operation data.

In this way, the system of the present embodiment is arranged so that the HIMPs describing their own unique control procedures of different sorts of terminal units having different hardware specifications are separately provided in the respective terminal units while the common terminal control program of the terminal units describing the common control procedure is provided in the electronic exchange 10. As a result, the amount of control program for the electronic exchange 10 itself to hold with respect to the respective terminal units can be reduced to a large extent. Further, the amount of control program for the electronic exchange 10 to hold for its own sake can be made invariable even after some terminal units are additionally provided in the system.

Furthermore, since the program updating and maintenance of the electronic exchange 10 is required only for the common control program held in the electronic exchange 10, the program management can be highly facilitated.

In addition, the the operation of the respective terminal units is managed and controlled based on the cooperative execution of the common terminal control program loaded from the electronic exchange 10 at the time of starting the terminals and their own HIMPs previously stored in the terminals. As a result, even in the event where different sorts of a plurality of terminal units are collectively connected to the electronic exchange 10, reasonable, fine and delicate exchange services to the respective terminal units can be reliably realized and maintained as in the prior art.

The system of the present embodiment is also effective for such a large-scale system as personal computers or the like which are further connected to terminal units of electronic key telephone sets or the like through suitable interfaces. In this case, when a program accommodates differences between the interface specifications is employed, the exchange services of such a large-scale system can be realized smoothly and efficiently.

Figure 6:
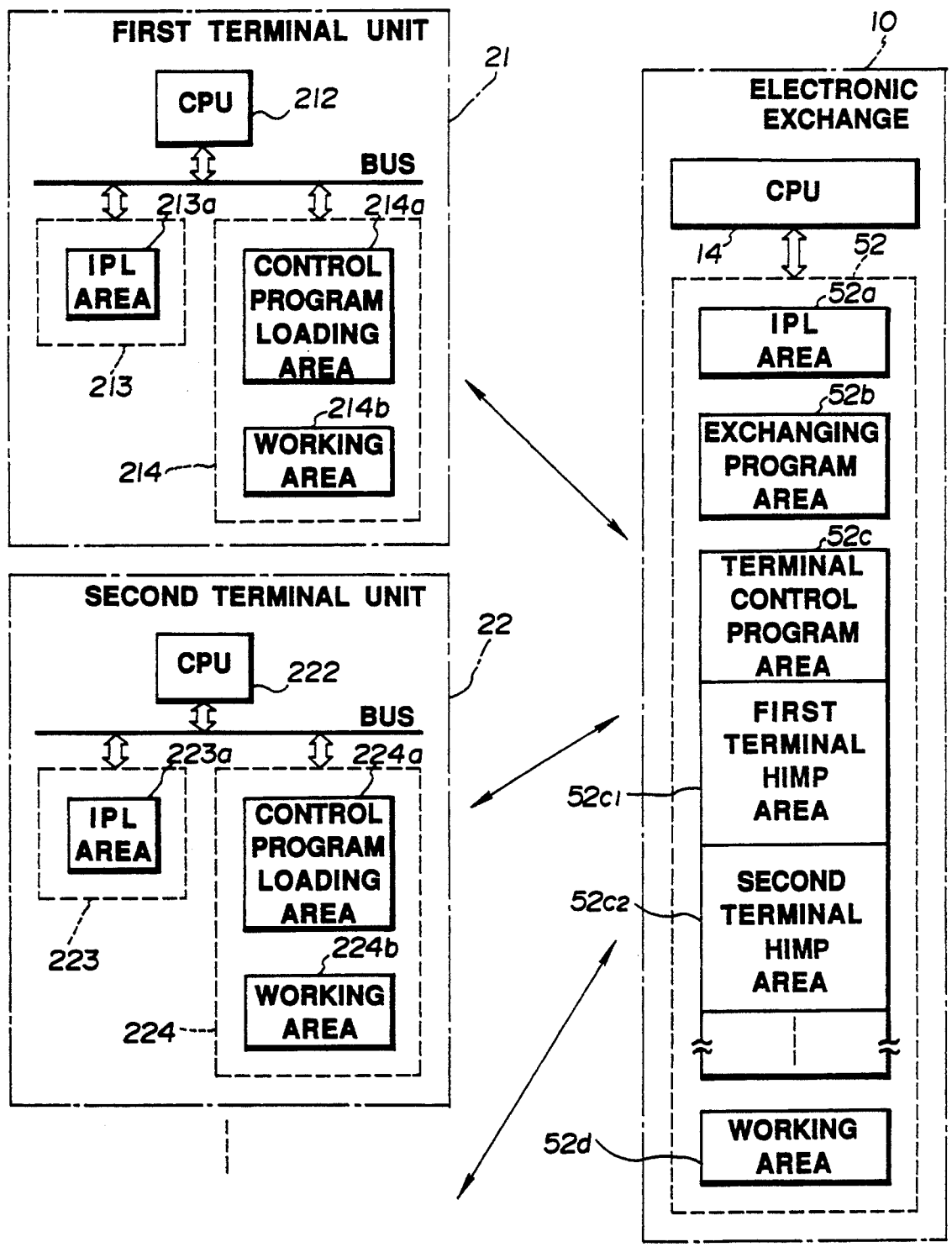
FIG. 6 is a block diagram for explaining a control program executing technique used in a master/slave system in accordance with another embodiment of the present invention.

Although the HIMPs of the respective terminals have been separately provided in the respective terminals in the form of a ROM in the foregoing system, these HIMPs may be also provided in the electronic exchange 10 as shown in FIG. 6, as a matter of course.

In the latter case, as shown in FIG. 6, an electronic exchange 10 includes a memory area 52 which corresponds to the area 51 (refer to FIG. 3) of the electronic exchange 10 in the foregoing system. More in detail, the memory area 52 has memory divisions of the ROM 15, RAM 16 and magnetic disk 17 and also has memory divisions of the first terminal HIMP area 52c1, second terminal HIMP area 52c2, ..., and nth terminal HIMP area 52cn. Other areas 52a, 52b, 52c and 52d included in the area 52 are substantially the same as the corresponding areas 51a, 51b, 51c and 51d in the area 51 of FIG. 3. Further, the configurations of the terminal units in the present embodiment are also substantially the same as those in the prior art system.

In the present embodiment, when each terminal unit is started, the common terminal control program and the terminal HIMP previously stored in one of the HIMP areas 51c1, 51c2 ... corresponding to the terminal unit are loaded (supplied) from the electronic exchange 10 into the terminal unit. After loaded with the programs in this way, the terminal unit is operated, for example, substantially in the same manner as explained in the connection with the loading and transferring operation of key data of FIG. 5.

This system requires the electronic exchange 10 have a memory area larger than that of the system of the first embodiment of FIG. 3, but can use the memory area more effectively with respect to the area 52c by an amount corresponding to the non-overlapped areas 50c1 to 50cn in the prior art system.

The master/slave system and its control program executing method in accordance with the present invention have been explained in the connection of the electronic exchange system as an example. The present invention is not limited to the particular example and may be applied to any other system, so long as, in the system, a plurality of sorts of slave devices having a common control procedure at least partly are connected to a single master device so that the master device can generally manage and control the operation of the respective slave devices.

What is claimed is:

1. A master/slave system including a single master device and a plurality of different types of slave devices connected to said master device, the operation of each of said slave devices being controlled and managed by said master device through control programs corresponding to each of said slave devices, said master device comprising:

memory means for storing therein a first control program constituting a part of said control programs, said first control program describing a control procedure common to said plurality of slave devices; and first communication means for transmitting said first control program to said slave devices, each of said slave devices comprising:

second communication means for receiving said first control program transmitted from said master device;

a first program memory for storing said first control program; and a second program memory for previously storing therein a uniquely associated one of a plurality of second control programs which constitute parts of said control programs, each of said second control programs describing a unique control procedure corresponding to a unique specification of the slave device in which the second program is stored, wherein said master device generally manages and controls the operation of said slave devices through said first control program transmitted to said slave devices, and each of said slave devices interprets the contents of said first control program through the unique control procedure of the second control program stored in said second program memory.

2. A master/slave system as set forth in claim 1, wherein said master device monitors a start of each of said slave devices and transmits said first control program to a slave device which has issued a start report, and wherein, when started, said second communication means of each of said slave devices transmits said start report to said master device, receives said first control program from said master device, and loads said first control program into said first program memory.

3. A master/slave device as set forth in claim 1, wherein said first program memory is a random access memory into which a latest version of said first control program is always loaded and said second program memory is a read-only memory in which one of said second control programs is fixedly stored.

4. A master/slave system as set forth in claim 3, wherein said second control programs are hardware interface module programs which accommodate differences in hardware amongst said plurality of different types of slave devices to allow common handling of said slave devices having different specifications through said first control program.

5. A master/slave system as set forth in claim 4, wherein said master device is an electronic exchange and said slave devices are various types and combinations of voice and data terminals which are connected to said electronic exchange to realize voice communication and various sorts of data communications.

6. A master/slave system as set forth in claim 4, wherein said master device is an electronic exchange and said slave devices are various types of voice terminals which are connected to said electronic exchange to realize voice communication.

7. A master/slave system as set forth in claim 4, wherein said master device is an electronic exchange and said slave devices are various types of data terminals which are connected to said electronic exchange to realize various sorts of data communications.

8. A control program executing method in a master/slave system including a single master device and a plurality of different types of slave devices connected to said master device, the operation of each of said slave devices being controlled and managed by said master device through control programs corresponding to each of said slave devices, each control program including a first control program previously stored in said master device, and a second control program previously stored in a corresponding slave device, said first control program describing the control procedure common to each of said slave devices and being a main control program for controlling data transfer between said master device and said slave devices, said second control program including a unique control procedure corresponding to a specification of the corresponding slave device and being a hardware interface module program which accommodates differences in hardware amongst said plurality of different types of slave devices to allow common handling of the slave devices having different specifications through said first control program, said method comprising the steps of:

(a) loading said first control program from said master device to one of said slave devices when said one slave device is started;

(b) initiating management and control of said one slave device through said first control program from said master device;

(c) interpreting command contents of said first control program through a control procedure contained in said second control program which is unique to said one slave device;

(d) translating data generated in said one slave device through one of said control procedures contained in said second control program which are unique to said one slave device; and (e) executing said control program corresponding to said one slave device using data translated in said one slave device.

* * * * *

UNITED STATES PATENT AND TRADEMARK OFFICE
CERTIFICATE OF CORRECTION

PATENT NO. : 5,349,673
DATED : September 20, 1994
INVENTOR(S) : Susumu YASUDA

It is certified that error appears in the above-indentified patent and that said Letters Patent is hereby corrected as shown below:

On the title page, in the Abstract, line 6, delete "of".

Signed and Sealed this

Twenty-sixth Day of September, 1995

Attest:

BRUCE LEHMAN

Attesting Officer      Commissioner of Patents and Trademarks